March 2, 1943.  R. R. CURTIS  2,312,526
BOOSTER PUMP
Filed Sept. 5, 1941   2 Sheets-Sheet 1

Inventor
RUSSELL R. CURTIS

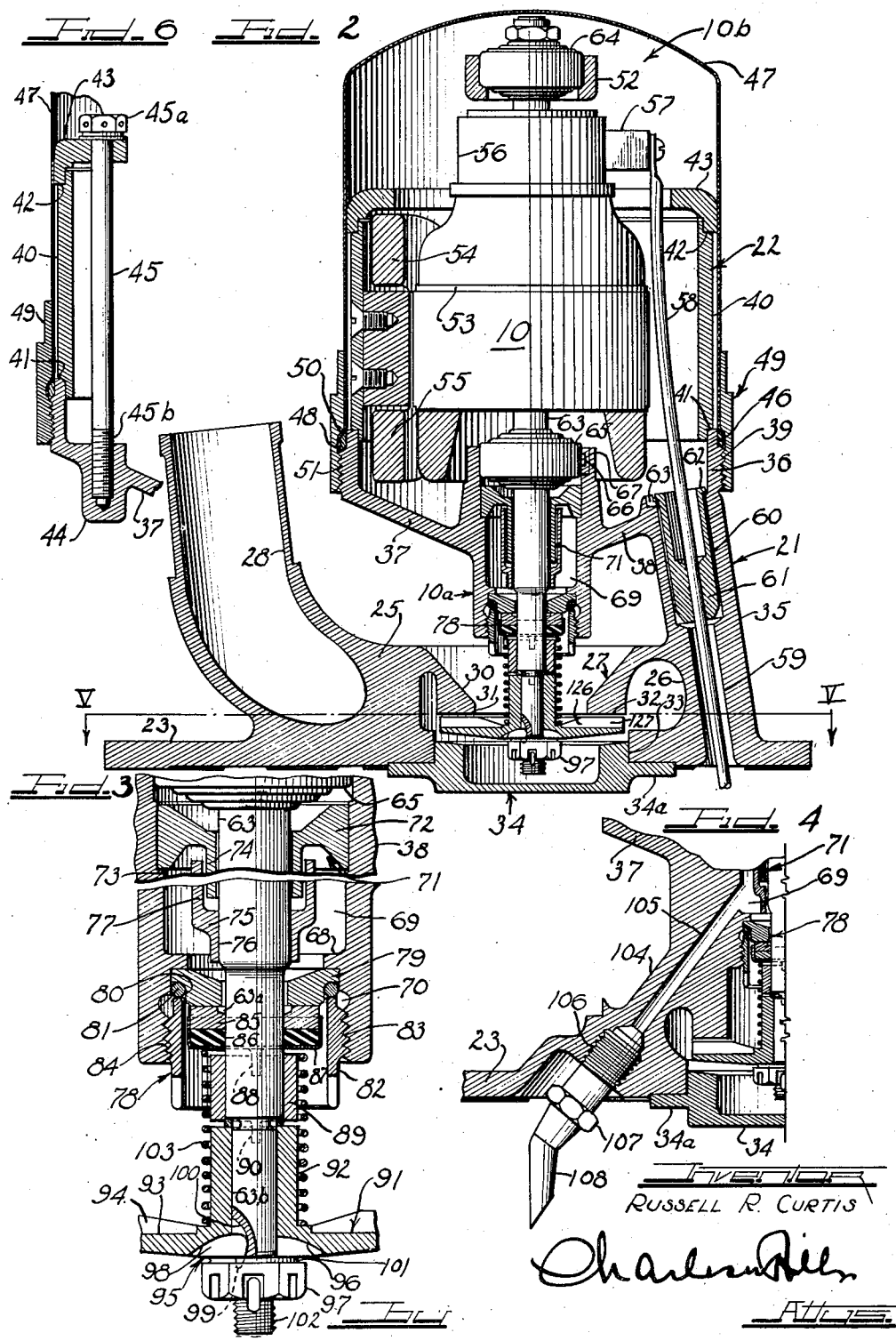

Patented Mar. 2, 1943

2,312,526

UNITED STATES PATENT OFFICE 2,312,526

BOOSTER PUMP

Russell R. Curtis, Dayton, Ohio, assignor to Curtis Pump Company, Dayton, Ohio, a corporation of Ohio Application September 5, 1941, Serial No. 409,645

15 Claims. (Cl. 103—87)

The present invention relates to a fuel system and more particularly to a submerged booster pump construction for an aircraft fuel system.

It is customary in all fuel systems of the forced feed type to provide at least one power driven pump to assure the proper delivery of fuel to an engine. In aircraft fuel systems, a plurality of such pumps are usually provided in the delivery line from the fuel tank to the engine. The pumps are so sequentially arranged that the discharge of one pump assures adequate delivery of fuel to the suction side of the next pump.

Furthermore, this arrangement of pumps must be such as to maintain adequate delivery of fuel under a wide variety of operating conditions such as experienced in flying aircraft at various altitudes with the resultant changes in temperature and pressure. Under certain conditions, less than all of the pumps may be required in operation. Consequently, each pump should be so driven that its operation is independently controlled by the pilot. One fuel pump is therefore usually driven by the aircraft engine for delivering fuel to the engine under all normal conditions. Additional pumps are either hand driven or separately power driven at the pilot's discretion. This assures proper fuel delivery under abnormal flying conditions at very high altitudes or during emergencies when one or more of the other pumps partially or completely fail to operate.

In aircraft constructions, available space for accessories is very limited. Consequently, a fuel system for use in aircraft constructions must be compactly constructed as to take up the least possible space.

Generally, the present invention seeks to provide an auxiliary or booster pump of the type which separates gas from a gas-liquid fuel mixture and delivers fully liquid fuel under pressure to the delivery line of a fuel system. Furthermore, the auxiliary or booster pump is so compactly constructed and arranged as to be mounted in a position submerged in a fuel tank. This permits space outside of the fuel tank which might otherwise be used for the pump to be available for other requirements. Likewise, such an arrangement permits the use of larger fuel tanks to fill the available space either in the wings or fuselage of an aircraft as no additional space is necessary within which to mount the auxiliary or booster pump.

Motive power, separate from the aircraft engine, such as an electric motor, is provided for driving the pump and its operation is controlled as desired usually by a switch between the pump and a source of electrical energy. As the entire pump construction together with the motive power is submerged in the fuel tank, the assembly requires the provision of sealing means between the device and the liquid fuel to render the device explosion proof.

A centrifugal pump is preferably used, as it permits free liquid flow therethrough even when not in operation. In addition, the assembly of such a pump and a driving member therefor, such as an electric motor, requires the provision of sealing means therebetween along the drive shaft for preventing leakage of liquids from the inlet of the pump portion to the motor portion and a barrier for preventing propagation of flame from the motor portion to the inlet of the pump portion.

It is also highly desirable to provide a circulating system for the motor driving the pump whereby to scavenge vapors therefrom and to cool the motor during its operation.

It is therefore an object of the present invention to provide a self-contained auxiliary fuel pump and motor adapted for mounting within a fuel tank to be entirely submerged in the fuel.

Another object of the present invention is to provide an explosion proof auxiliary pump and prime mover assembly for a fuel system adapted for mounting within the fuel tank.

A further object of the present invention is to provide a driven auxiliary pump for a fuel system which is removably mounted within a fuel tank.

A still further object of the present invention is to provide a driven auxiliary pump construction for a fuel system which is mounted within a fuel tank with the pump portion and its flow inlet being effectively sealed from the prime mover portion.

Another object of the present invention is to provide an air cooled vapor scavenged power driven auxiliary pump unit for a fuel system which is small, compact, and easily mounted in a fuel tank of the system.

A further object of the present invention is the provision of an electric motor driven booster pump unit mounted within a fuel tank for aircraft fuel systems which is effectively sealed from the fuel within the tank and against fuel leakage from the pump portion to the electric motor portion and is further sealed against flame or spark propagation from the electric motor to the pump portion.

Another and still further object of the present invention is the provision of a driven booster pump unit within the fuel tank of an aircraft fuel system which delivers fuel free of gas and vapor to a delivery line from the fuel tank.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 2 is an enlarged vertical cross-sectional view with parts in elevation, of the pump construction illustrated in Figure 1;

Figure 3 is a fragmentary and enlarged vertical cross-sectional view of a portion of Figure 2, with parts in elevation, illustrating details of construction between the pump and motor portions of the unit of this invention;

Figure 4 is a fragmentary and enlarged vertical cross-sectional view of a portion of a pump illustrated in Figure 2, with parts in elevation, as seen when taken in the plane indicated by the line IX—IX of Figure 5;

Figure 1:
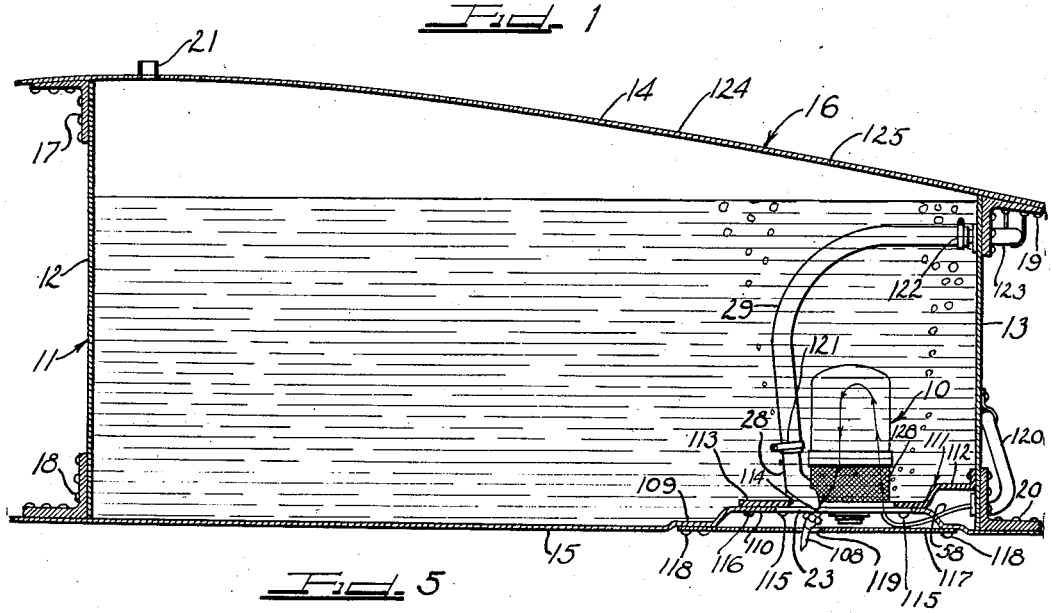
Figure 1 is a fragmentary view in vertical cross-section, with parts in elevation, of an aircraft wing and wing mounted fuel tank illustrating the manner in which the booster pump unit of this invention is mounted within the fuel tank and the manner in which a tube or pipe extends from the unit into the slip stream of the aircraft for actuating a pump vapor-scavenging and cooling system.

As best seen in Figure 1, a pump assembly 10, including a prime mover therefor, is illustrated as being mounted within a fuel tank 11. In the present construction, the sidewalls of the fuel tank 11 are formed by front and rear wing spar webs 12 and 13 which are connected to the upper surface or top wing skin 14 and the lower surface or bottom wing skin 15 of an aircraft wing construction 16 by means of front and rear wing spars 17, 18, 19, and 20. As shown, the spar webs 12 and 13 are connected to the vertical flanges of the wing spars by means of rivets. The top and bottom wing skins are also connected to the horizontal flanges of the wing spars by means of rivets. The ends of the fuel tank are formed by transverse wing ribs (not shown). In this construction as illustrated in Figure 1, the tank 11 is provided with a vent 21 in the upper surface 14 of the wing construction.

It is to be understood, however, that the tank 11 may be a self-contained unit of such configuration as to be inserted within the wing construction and supported therein by saddles and strapped in place to permit some degree of freedom to avoid the tank being subjected to undue strain as the wing strucure deflects under load.

It is to be further understood, of course, that although the pump assembly 10 of the present invention is illustrated as forming a portion of an aircraft fuel system, the device is adapted for use with any vehicle in which liquid fuel is delivered from a fuel tank to a prime mover for the vehicle. Furthermore, the pump assembly 10 may, if desired, be mounted within the fuel tank 11 perpendicularly to the lower edge 15 of the wing construction at any point between the side walls 12 and 13 or may be connected perpendicularly to a sidewall of the tank along a lower portion thereof. However, the most efficient mounting of a pump assembly 10 is in an upright vertical position on the lower edge 15 of the wing construction as shown in order that the pump be positioned below the hydraulic gradient of the fuel tank to freely receive fuel at its intake. As will be more apparent from the following description, the intake of the pump assembly is at the lower end thereof in order that it be positioned as closely as possible to the bottom of the fuel tank 11. Of course, when the pump assembly 10 is mounted vertically on a sidewall 12 or 13, the position introduces the undesirable feature of maintaining the liquid fuel above the pump throat so that the tank can never be drained as completely as when the pump is positioned upright on the bottom wall of the fuel tank.

The pump and prime mover assembly is best illustrated in Fig. 2 and includes a pump portion 10a and a prime mover portion 10b. The pump portion is enclosed by a casing 21 while the motor portion is encased by the casing 22.

Figure 5:
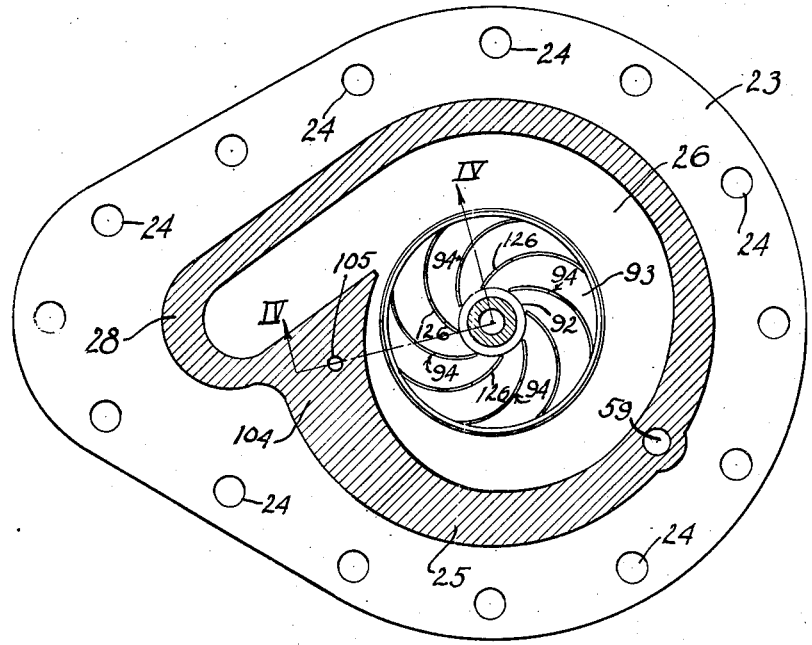
Figure 5 is a transverse cross-sectional view, with parts in elevation, of a pump construction as seen when viewed in a plane taken substantially along the line V—V of Figure 2; and, Figure 6 is a vertical cross-sectional view, with parts in elevation, along a portion of the motor assembly illustrating the manner in which the motor housing is attached to the pump casing.

As best shown in Figs. 2 and 5, the pump casing 21 has an oval shaped head 23 with a plurality of apertures 24 therethrough adjacent its outer edge for a purpose to be more fully explained hereinafter. The casing is thickened as at 25 and is so shaped as to define an internal volute chamber 26 communicating along the inner periphery thereof with a throat inlet 27 and opening in the outer periphery thereof into a discharge member 28 which, in turn, as shown in Fig. 1, is connected to a fuel delivery line 29.

The throat inlet 27 includes an inwardly tapered surface 30 and a substantially cylindrical surface 31. The surface 31 and the internal volute chamber 26 are connected by a flat surface 32. An opening 33 connects the outer face of the head 23 with the internal volute chamber 26 and receives therein a cap member 34 removably connected to the head 23 by studs (not shown) or other suitable means. The cap member 34 is cup-shaped and has an annular flange 34a extending outwardly from the periphery thereof for engagement against the outer surface of the head 23 and may be suitably apertured to receive therethrough the connecting means such as the studs.

An integral column 35 extends angularly upwardly from the side of the thickened portion 25 opposite the discharge member 28 and terminates at its upper end in a cylindrical casing portion 36. A wall 37 of the casing slopes inwardly from the casing portion 36 toward the axis of the pump assembly and thence downwardly as illustrated in Figure 2 where it terminates in a cylindrical shaft housing 38. It is to be noted that the shaft housing 38 is in axial alignment with the throat inlet 27.

The outer periphery of the casing portion 36 is externally threaded as at 39 for a purpose to be hereinafter described.

The motor casing 22 includes a cylindrical member 40 having reduced end portions defining shoulders 41 and 42. The member 40 is inserted into the pump casing portion 36 with its shoulder 41 abutting against the end thereof. An apertured end cap 43 embraces the opposite end of the cylindrical member 40 and abuts against the shoulder 42 thereof.

As shown in Figure 6, the sloping casing wall 37 is provided with internally threaded circumferentially spaced bosses such as 44, while the end cap member 43 has circumferentially spaced apertures for receiving therethrough a plurality of draw bolts 45, only one of which is shown. Each draw bolt 45 has a head 45a for abutment against the end cap member 43 and a threaded end 45b for threaded engagement within an internally threaded boss 44. It is preferred that the reduced ends of the member 40 be sized to slidingly fit within the casing portion 36 and the end cap 43.

An annular groove is provided around the outer periphery of the casing portion 36 adjacent the external threads 39 for receiving therein a resilient packing member. 46. A cup-shaped enclosure member 47, formed preferably of thin sheet metal, has its end margin 48 flared outwardly to embrace the packing 46. A tubular sleeve member 49 has an intermediate shoulder 50 formed on the inner periphery thereof and internal threads 51 at one end thereof. The tubular sleeve member 49 embraces the free end of the cup-shaped enclosure member 47 and the internal threads 51 thereof are threaded on the external threads 39 of the casing portion 36. The tubular member 49 is threaded on the casing portion 36 until the internal shoulder 50 thereof tightly abuts against the outwardly flared portion 48 to hold the latter in sealing engagement with the packing 46. This provides a fluid seal between the casing portion 36 and the enclosure member 47.

A bearing housing 52 is suitably carried in spaced relation from the end cap member 43 by any suitable means such as webs from the cap (not shown) so that the axis of the housing is in alignment with the axis of the shaft housing 38.

The prime mover is preferably an electric motor comprising an armature 53, axially spaced field coils 54 and 55, a commutator 56 and commutator brushes such as 57, only one of which is shown. The commutator brushes have connected thereto a conductor 58 which extends through the hollow supporting column 35 in a manner now to be described.

The supporting column 35 is hollow throughout its length and includes a bore 59 partially therethrough for loosely receiving the conductor 58 and an enlarged bore 60 at its upper end for loosely receiving therein a sleeve member 61. The sleeve member 61 is tubular and has a reduced bored portion for tightly receiving therethrough the conductor 58. The outer diameter of the sleeve 61 is approximately .010 inch smaller than the inner diameter of the enlarged bore 60 to provide an air space therebetween. The upper end of the sleeve 61 has a shoulder flange 62 abutting against the end of the supporting column 35. A slot 63 is provided in the end of the supporting column 35 to permit air to flow freely between the sleeve 61 and the inner periphery of the bore 60 as the shoulder flange 62 would otherwise form a seal between the end of the sleeve and the end of the supporting column. In this manner, an air flow space is provided from the outside of a pump assembly through the bores 59 and 60 into the inside of the motor portion of the pump assembly.

The electric motor armature 53 is carried by a shaft 63 and is supported in the housing 52 by means of an anti-friction bearing 64. The shaft 63 is also supported in the shaft housing 38 by an anti-friction bearing 65. A lug 66 on the bearing 65 seats within a slot 67 in the end of a shaft housing 38 to hold the outer race of the bearing against rotation. The slot 67 also provides an airflow passageway from the motor casing into the shaft housing.

The details of construction along the pump shaft 63 below the anti-friction bearing 65 are best illustrated in Fig. 3. The shaft housing 38 has an inwardly extending shoulder 68 intermediate the ends on the inner periphery thereof. This shoulder divides the inside of a shaft housing 38 into connected chambers 69 and 70. It will be noted that the chamber 69 has a larger inside diameter than the chamber 70.

A flame barrier construction 71, within the chamber 69, includes a sleeve member 72 having its outer periphery press fitted into the upper enlarged end of a chamber 69 to seat against the shoulder 73. The inner portion of the member 72 is formed as a tubular sleeve 74 and is sized for receiving the shaft 63 therethrough in spaced relation. A second member 75 is cup-shaped and has one end 76 thereof internally bored for snugly engaging a portion of a shaft 63 in spaced relation from the sleeve 74 of the first member. The upper portion of the member 75 is cup-shaped to provide a cylindrical sleeve portion 77 overlapping the sleeve portion 74 in spaced relation therefrom. As the shaft 63 rotates, the member 75 rotates therewith and the tortuous path between the members and between the sleeve portion 74 and the shaft 63 assures that flame from an explosion within the electric driving motor will not be propagated beyond the chamber 69. It is well known that flame will not pass through tortuous paths of reduced size, and since the pump assembly 10 is to be submerged in the fuel of the fuel tank, it is necessary that the driving motor portion be sealed from the pumping portion of the assembly in order that the latter be made explosion proof. Furthermore, as the pump assembly of this invention is intended preferably for use on aircraft, it is desirable to hold the weight and size to a minimum, and consequently the labyrinth arrangement defining the tortuous path of the flame barrier construction 71 is provided for obtaining the required length of a flame trap within the shortest practical longitudinal length along the shaft 63.

The chambers 69 and 70 are sealed against liquid leakage therebetween by a seal construction 78. This seal construction comprises a metal ring 79 loosely embracing a reduced portion 63a of the pump shaft and seated on the inwardly extending shoulder 68 formed on the inner periphery of the shaft housing 38 intermediate its ends. The marginal edge at the periphery of the ring member 79 is of reduced thickness to define an annular slot 80 between the body of the ring and the inner periphery of the chamber 70. A resilient ring member 81 is seated in the slot 80 and is engaged by a tubular seal nut 82. It is to be noted that the tubular seal nut 82 is externally threaded as at 83 for engaging internal threads 84 in the pump housing defined by the chamber 70. When the seal nut 82 is threaded toward the shoulder 68, the resilient ring member 81 is expanded in a radial direction to tightly seal the slot 80.

A compressed graphitic carbon seal ring 85 closely embraces the shaft portion 63a but is not necessarily driven thereby. The carbon ring 85 and the metal seal ring 79 are mounted in sliding face engagement. A resilient cushion washer 86, preferably formed of fuel and oil resisting artificial rubber, such as Neoprene, abuts against the carbon ring 85. The cushion washer snugly engages the shaft portion 63a in sealing relation therewith. A cup member 87 surrounds the shaft portion 63a, the resilient cushion washer 86 and the carbon ring 85. Axially extending tangs or fingers 88 engage within suitable slots in a sleeve coupling member 89. The opposite end of the sleeve coupling member 89 has axially extending tangs or fingers 90 for a purpose to be later described.

The free end of the pump shaft 63 is further reduced in a portion 63b for the purpose of receiving thereon the centrifugal pumping mechanism now to be described. The pump portion 10a of the pump assembly has an impeller 91 comprising a hub 92, a flat disk flange 93, and a series of radially curved vanes 94, as shown in Figure 5. The impeller is secured to the shaft portion 63b by a key 95, a washer 96, and a nut 97 threaded on the end of the shaft portion 63b. The key 95 is L-shaped and has one leg 98 longer than the opposite leg 99. The shaft portion 63b is provided with a longitudinally extending partially circular keyway 100, such as used with Woodruff keys, in registry with a radially extending segmental circular keyway in the outer face of the impeller flange 93. The key leg 98 is curved to complementally seat within the keyway 101, while the key leg 99 is curved to seat within a portion of the curved keyway 100. It is to be noted that when the key 95 is seated within the keyways 100 and 101, the leg 99 extends upwardly beyond the outer surface of the impeller flange 93. This extending portion of the key leg 99 is seated in the shaft keyway 100 and extends into an aperture (not shown) of the washer 96. When the nut 97 is threaded to the externally threaded portion 102 of the shaft portion 63b, the washer 96 surrounds the shaft and the key leg 99 and seats against the key leg 98 to tightly maintain the key within the keyways whereby the impeller is locked to the shaft.

The circularly cut keyway 101 in the flange 93 is conveniently cut with a milling cutter and the leg 99 of the key by being seated in the washer 96 is held against radial displacement out of the thus cut slot. The key 95 is so shaped as to readily permit its entry after the impeller has been assembled on the shaft. This is effected by rocking the key into the aligned keyways to the position shown and then tightening the nut against the washer as previously described. The heretofore required press fitting of a rectangular Woodruff key in a slot formed longitudinally in the shaft portion 63b before mounting the impeller on the shaft is thus avoided.

The free end of the impeller hub 92 is provided with axially extending slots for receiving therein the tangs 90 on the coupling sleeve 89. A coil spring 103 embraces the coupling sleeve 89 and the impeller hub 92 and is seated at one end against the impeller flange 93 and at its other end against the cup member 87. The coil spring exerts a constant force on the resilient cushion washer 86 for maintaining the carbon ring 85 tightly against the metal seal ring 79. At the same time, the urging of the cup by the spring serves to squeeze the resilient cushion washer 86 in the cup member 87 to insure rotation of the washer 86 with the cup and the washer 86 in turn drives the carbon ring to effect sliding face engagement with the metal ring 79. This construction provides a seal between the chambers 68 and 70.

It is preferred that graphitic carbon be used in the rotating seal ring 85 as it provides satisfactory wear and seal characteristics during the pressure sliding engagement with the face of the metal seal ring 79. It is to be understood, however, that any other suitable material having similar properties may be used.

The frictional drive for the rotating carbon seal ring 85 has been found necessary due to the fragility of the material as it will chip or crack if forced on the shaft in order to be driven directly thereby.

As shown in Figure 2, the shaft housing 38 is in axial alignment with the throat inlet 27. The pump impeller 91 is inserted through the opening 33 and is connected to the shaft portion 63b in a manner as previously described. When so connected, the upper edges of the curved vanes 94 lie adjacent the flat surface 32 on the under side of the throat. The cap member 34 is then inserted into the opening 33 to close the same and is connected to the flange 23 in a manner as previously described herein. It will be noted in Figure 2 that the cap member 34 extends into closely spaced relation from the outer surface of the impeller flange 93. The space between the end of the cap 34 and the flat surface 32 on the underside of the throat forms a pumping chamber for the impeller vanes adjacent the internal volute chamber 26. The action of the impeller will be more fully described hereinafter.

As best shown in Figure 4, a casing portion 104 is provided between the head 23 and the sloping casing wall 37. It will be seen in Figure 5 that the casing portion 104 is positioned adjacent the discharge member 28. An angularly extending bore 105 is provided in the casing portion 104 and extends from the chamber 69 to the outer face of the head 23. The outer end of the opening 105 is enlarged and internally threaded as at 106 for receiving therein a coupling member 107. A tube 108 is carried by the coupling 107 and extends away from the head 23 in substantially right angular relation thereto for a purpose to be later described.

In Figure 1, there is illustrated the construction by which the pump assembly 10 is removably connected to and within the fuel tank 11. The lower edge 15 of the wing construction is upwardly offset to provide a circular ring portion 109. The lower wing edge 15 is additionaly offset to form an adjacent ring supporting portion 110. The latter ring supporting portion is internally apertured to snugly receive therein the oval-shaped head 23.

A hanger bracket 111 has one end 112 connected to the side wall 13 of the fuel tank by rivets, as shown in Figure 1, or by other suitable means. The bracket is offset downwardly and is provided with a forwardly extending portion 113 which is suitably apertured as at 114 for receiving therethrough the entire pump assembly 10 above the head 23. The aperture 114 is smaller than the oval-shaped flanged periphery of the head 23 so that the latter abuts against the hanger end 113 and is connected thereto by means of bolts 115 or the like, which extend through the head apertures 24. The hanger portion 113 of the bracket 111 is connected to the ring support portion 110 by means of bolts 116 or the like. In the present instance, it is preferred that the connecting members 115 and 116 be cap screws in order that the pump assembly 10 may be easily assembled to and disassembled from the fuel tank 11 from the outside thereof. If desired, a gasket (not shown) may be inserted between the hanger bracket portion 113 and the pump head 23 to insure against liquid leakage therethrough.

It will be noted that, when the pump assembly is so mounted within the fuel tank 11, the tube 108 extends downwardly below the lower edge 15 of the wing structures. A flat closure plate 117 is connected to the ring supporting portion 109 by the cap screws 118 and the outer surface thereof is flush with the outer surface of the lower wing edge 15. The closure plate 117 closes the depression formed by the offset portions of the wing edge 15 to provide a mounting for the pump assembly and thereby forms a smooth continuation of the wing surface. An opening 119 is formed in the closure plate 117 for receiving therethrough the tube 108.

The flow of air in the slip stream past the end of the tube 108 creates a partial vacuum in the tube and induces a flow of air through the interior of the motor as illustrated by the solid line arrows in Figure 1. As previously described with Figure 2, the air inlet is through the bore 59 where it passes through the space between the bore 60 and the sleeve 61, through the opening 63, around the interior of the motor portion 10b, through the slot 67 in the end of the shaft housing 38, through the flame barrier construction 71 and then downwardly through the opening 105 and the tube 108.

The flow of air through the motor effects a cooling of the motor and a continuous scavenging of any vapors within the motor, the flame barrier construction 71 and the seal construction 78.

The pump portion 10a of the pump assembly is driven by the electric motor energized through the electrical conductor 58. As shown in Figure 1, the conductor 58 passes through the fuel tank side wall 13 and through a tube or other covering 120. The end of the conductor 58 is connected to a source of electrical energy (not shown).

The discharge member 28 is connected to one end of a fuel delivery line 29 by means of a clamp 121. The other end of the fuel delivery line 29 is connected by a clamp 122 to a delivery line 123 which extends through the fuel tank side wall 13. The fuel delivery line 123 extends to the carburetor of the vehicle engine (not shown).

If desired, the fuel delivery line 29 may be formed of flexible material impervious to the liquid fuel 124 such as gasoline.

When the motor portion 10b is energized at the discretion of the pilot, the curved impeller vanes 94 agitate the liquid fuel such as gasoline flowing through the inlet throat 27. The liquid fuel may contain occluded gases, loosely dissolved gases and volatiles about to be liberated as vapors. In order to stabilize the fuel for high altitude performance these ingredients should be liberated from the liquid to prevent vapor lock in the fuel system. The booster pumps of this invention serve to beat out such ingredients from the liquid in the form of bubbles 125 which rise through the liquid and burst at the surface of the liquid pond to discharge the gases and vapors into the atmosphere. At the same time the booster pumps pressure the bubble freed liquid above the vapor pressure of the liquid to permit additional vaporization. The pressured liquid is held under pressure throughout the fuel delivery line.

When the fuel enters into the inlet throat 27, the inner tapered portions 126 of the curved vanes 94 agitate the fuel and beat out, in bubble form, the gases, vapors and loosely dissolved volatiles. The curved vanes form an upwardly and outwardly spiraling whirlpool path in the fuel and the liberated gas and vapor bubbles 125 follow the whirlpool path as shown in Figure 1. As soon as the bubbles reach the surface of the liquid they burst into the atmosphere. The bubble freed fuel is centrifugally forced through the pumping channels defined by adjacent vane portions 127, the flat surface 32 and the impeller flange 93 into the volute chamber 26 and the delivery line 29.

The speed at which the gas and vapor bubbles 125 are liberated and the pressure at which the fully liquid fuel is pumped may be varied by varying the speed at which the pump impeller is driven.

If it is desired to strain the liquid fuel as it is drawn into the pump inlet 27, a screen 128 may be mounted as illustrated in Figure 1. The size of mesh used will depend on the amount of filtering desired but it must be large enough so that the bubbles 125 will be forced therethrough by the agitating vane portions 126 of the revolving impeller. The screen 128 will be generally cylindrical in shape with its upper end abutting against the tubular sleeve member 49 and its lower end being seated on the head 23. Portions are cut out in order that the screen may snugly fit against projecting portions such as the discharge member 28 in a manner as shown in Figure 1.

It will be apparent from the foregoing that I have provided a driven pump assembly adapted for mounting in a tank to be submerged in liquid within the tank and having pump and motor portions effectively sealed against the leakage of liquid fuel or fuel vapors therebetween. The motor and pump devices of this invention are explosion proof, vapor scavenged, and air-cooled.

While a particular embodiment only of this invention has been illustrated, it will, of course, be understood that the invention should not be limited thereto, since many modifications may be made, and, therefore, it is contemplated by the appended claims to cover all such modifications as fall within the true spirit and scope of the present invention.

I claim as my invention:

1. In a liquid fuel system including a fuel tank, the improvement which comprises a fuel pump mounted in said tank for receiving fuel directly therefrom, and means associated with said pump for beating out bubbles of gas and vapor from the liquid fuel, said means including agitators positioned for continuous open communication with fuel in the tank to act on the fuel before it becomes confined in the pump.

2. In a fuel system including a fuel tank and a pump and motor unit submerged in the fuel in said tank, the improvement comprising a casing for said unit for sealing the motor portion of the unit from the fuel in the tank, means removably mounting said casing in said tank, and passageways through said casing connecting the interior of the casing sealing the motor portion of the unit with the exterior of said tank for fluid circulation around said motor portion.

3. In a fuel system including a fuel tank and a pump and motor unit submerged in the fuel in said tank, the improvements comprising a casing having connected portions separately housing the pump and motor of said unit, means mounting said casing in said fuel tank, and other means defining inlet and outlet fluid flow paths extending through the casing portions housing both the pump and motor of said unit for connecting the interior of the casing portion housing said motor with the exterior of said tank for fluid circulation therebetween.

4. In a fuel system including a fuel tank and a pump and motor unit submerged in the fuel in said tank, the improvement comprising a casing having axially spaced portions for separately housing the pump and the motor of said unit and support portions connecting said spaced portions adjacent their peripheries, means removably mounting said casing in said tank, and passageways through said casing portion for the pump and through said support portions for connecting the interior of the casing portion for the motor with the exterior of said tank for fluid circulation therethrough.

5. In a fuel system for a vehicle including a fuel tank and a pump and motor unit submerged in the fuel in said tank, the improvements comprising a support casing having an inlet opening for mounting the pump of said unit in said tank, driving means for said pump, a casing sealing said driving means from the interior of said tank, and support means connecting said casings, said support casing and support means having passageways therethrough communicating with the interior of said driving means casing, and a vent member extending from the exterior of said vehicle into communication with one of said passageways and having a discharge mouth arranged to be evacuated by a suction developed in the vent member by movement of the vehicle whereby fluid circulation is effected through said passageways and the interior of said driving means casing.

6. In a fuel system for a vehicle including a fuel tank and a pump and motor unit submerged in the fuel in said tank, the improvements comprising a flanged base, means connecting said flanged base to a wall of said tank for mounting said unit in the interior of the tank, a casing portion on said base for housing the pump of said unit, a casing portion for sealing the motor of said unit from the interior of said tank, means connecting said casing portions, said connecting means and casing portions having passageways therethrough connecting the interior of said motor casing portion with the exterior of said tank for fluid flow therebetween, and a suction pipe extending from one of said passageways to the atmosphere for drawing air through the other of said passageways and the motor casing portion.

7. In a fuel system for a vehicle including a fuel tank and a pump and electrical motor unit submerged in the fuel in said tank, the improvements comprising a casing having spaced portions connected by support portions, said casing portions respectively housing the motor and pump of said unit, said casing and support portions having passageways therethrough connecting the interior of said motor casing portion with the exterior of said tank for fluid flow therebetween, an electrical conductor extending through one of said passageways connecting said motor with a source of electrical energy, and a suction pipe extending from the other of said passageways to the atmosphere for drawing air through said one passageway and the motor casing portion.

8. In a fuel system including a fuel tank and a pump and motor unit submerged in the fuel tank, the improvements comprising a casing for said pump and motor unit having a mounting flange thereon, and an internal mounting in said tank for said pump and motor unit, said internal mounting having a flange on a portion of a wall of said tank with an opening for receiving the mounting flange of said pump and motor unit therein, a mounting bracket carried by a wall of said tank and having an aperture for receiving the casing for said pump and motor unit therethrough, and means connecting said flanges to said bracket for sealing said encased pump and motor unit in said tank.

9. In a fuel system including a fuel tank and a pump and motor unit submerged in the fuel tank, the improvements comprising a casing for said pump and motor unit having a mounting flange thereon, and a removable mounting for said encased pump and motor unit in said tank, said removable mounting having a flange inturned from one wall of said tank with an aperture therein for complementally receiving said mounting flange, a bracket carried by said tank having an aperture therein for receiving said encased pump and motor unit therethrough and overlapping said mounting flange thereon, means connecting said flanges and said bracket for sealing said encased pump and motor unit in said tank, and a covering plate connected to said inturned flange of the tank and being flush with said one wall of the tank.

10. In a fuel system including a tank for a pond of liquid fuel and a fuel pump and motor unit in said tank adapted to receive liquid from the pond and deliver the liquid out of the tank under pressure, the improvements of a support construction for sealing the motor of said unit from the pond of fuel in said tank, and means including an inlet and an outlet defining an air flow path through said support construction for circulation of air from and to the outside of the tank through the interior of the support construction around the sealed motor of the unit to cool the motor.

11. A fuel pump assembly comprising a hollow casing having connected bores of unequal size, an impeller in said casing, the smaller of said bores being in a portion of the casing overlapping the impeller and the larger of said bores surrounding the periphery of said impeller, and a removable closure in said larger bore whereby said impeller is removable from said casing.

12. In a fuel system, a tank having an apertured wall portion at or near the bottom thereof, a pump and motor unit in said tank, said unit having spaced connected pump and motor portions with a pump inlet throat between the portions in open communication with the interior of the tank, said pump portion having an apertured head aligned with the tank wall aperture, and a closure for the head aperture, said closure being removable from the outside of the tank to give access to the interior of the pump within the tank.

13. A pump and motor unit adapted for mounting in a tank on an apertured wall portion thereof which comprises said unit having longitudinally spaced connected pump and motor portions with a pump inlet lying in the space between the portions, an apertured head on the end of said pump portion remote from the motor portion adapted to be seated in the aperture of the tank wall, and a closure for the head aperture adapted to be removed from outside of the tank to give access to the interior of the pump.

14. A pump and motor assembly adapted for submersion in liquids to deliver gas-freed liquids which comprises a casing having spaced opposed pump chamber and motor chamber portions, said pump chamber portion having a central liquids inlet communicating with the space between said portions, a motor in said motor chamber portion, drive means extending from said motor across the space between said poritons, a pump impeller in the pump chamber portion connected to said drive means, and agitators associated with said impeller positioned for open communication with the space between the casing portions to beat out bubbles of gas and vapor from liquids in which the assembly is mounted before the liquids become confined in the pump chamber.

15. In combination with a container having an aperture in a wall thereof, a casing mounted in said container around the aperture thereof, said casing defining a motor chamber and an open-ended pump chamber in spaced relation from the motor chamber, one open end of the pump chamber opening toward the motor chamber to join the space between the motor and pump chambers with the pump chamber, the other open end of the pump chamber being aligned with the container aperture, a motor in the motor chamber having a drive shaft extending across the space between the chambers, an impeller in the pump chamber driven by said shaft, and a removable cap accessible from outside the container closing said other open end of the pump chamber.

RUSSELL R. CURTIS.